(12) United States Patent
Yamada et al.

(10) Patent No.: US 6,538,190 B1
(45) Date of Patent: Mar. 25, 2003

(54) METHOD OF AND APPARATUS FOR REPRODUCING AUDIO INFORMATION, PROGRAM STORAGE DEVICE AND COMPUTER DATA SIGNAL EMBODIED IN CARRIER WAVE

(75) Inventors: Youichi Yamada, Tokorozawa (JP);
Hiroyuki Isobe, Tokorozawa (JP);
Takashi Suzuki, Tokorozawa (JP);
Koichiro Sakata, Tokorozawa (JP);
Tomohiko Kimura, Tokorozawa (JP);
Takeaki Funada, Tokorozawa (JP);
Kazuo Kamei, Tokorozawa (JP); Gen Inoshita, Tokyo-to (JP); Kensuke Chiba, Tokyo-to (JP); Naomi Amemiya, Tokorozawa (JP); Hiroyasu Eguchi, Tokorozawa (JP); Keitaro Kaburagi, Tokorozawa (JP); Akiharu Yagi, Tokorozawa (JP); Toru Yada, Tokorozawa (JP); Yoshinori Kataoka, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/631,957

(22) Filed: Aug. 3, 2000

(30) Foreign Application Priority Data

Aug. 3, 1999 (JP) .......................................... 11-220214

(51) Int. Cl.[7] ................................................. G10H 1/42
(52) U.S. Cl. ...................... 84/636; 84/668; 84/DIG. 12
(58) Field of Search ........................... 84/611, 612, 635, 84/636, 651, 652, 667, 668, 713, 714, DIG. 12; 434/307 A (56) References Cited

U.S. PATENT DOCUMENTS

| 5,747,716 A | * | 5/1998 | Matsumoto ............... 84/612 X |
| 5,869,783 A | * | 2/1999 | Su et al. ....................... 84/612 |
| 5,973,255 A | * | 10/1999 | Tanji ........................... 84/636 |
| 6,066,792 A | * | 5/2000 | Sone ........................ 84/611 X |

FOREIGN PATENT DOCUMENTS

| JP | 60-166892 | 11/1985 |
| JP | 8-201542 | 8/1996 |

* cited by examiner

Primary Examiner—Stanley J. Witkowski
(74) Attorney, Agent, or Firm—Sughrue Mion, PLLC (57) ABSTRACT

An audio information reproducing apparatus reproduces one audio information and reproduces another audio information after said one audio information. The apparatus is provided with: a detecting device for detecting one time period required for one beat of said one audio information, and also detecting another time period for one beat of said another audio information; and a reproducing device for reproducing said another audio information continuously to said one audio information while controlling the detected another time period to be coincident with the detected one time period. Alternatively or additionally, the apparatus is provided with: a detecting device for detecting one beat timing which is a timing of a beat of said one audio information and also detecting another beat timing which is a timing of a beat of said another audio information, so that the reproducing device controls the detected another beat timing to be coincident with the detected one beat timing.

21 Claims, 5 Drawing Sheets

METHOD OF AND APPARATUS FOR REPRODUCING AUDIO INFORMATION, PROGRAM STORAGE DEVICE AND COMPUTER DATA SIGNAL EMBODIED IN CARRIER WAVE

BACKGROUND OF THE INVENTION

1. Field of the Invention

The present invention relates to a method of and an apparatus for reproducing audio information, and an information record medium on which an audio information reproduction program to enable such a reproduction is recorded and which can be read by a computer, and more particularly relates to a method of and an apparatus for reproducing the audio information, which can reproduce two or more audio information continuously without intermittence while maintaining a constant rhythm. The present invention also relates to a program storage device such as an information record medium for storing a program and a computer data signal embodied in a carrier wave, which enable a computer to perform such an audio information reproduction.

2. Description of the Related Art

A club or salon referred to as a so-called "club" in Japan is very popular in which young persons mainly enjoy a dance in time to a music composition having a nimble rhythm. In such a club, in order for the persons to enjoy the dance, it is preferred that a plurality of music compositions are continuously played while a constant rhythm is maintained, even between different music compositions.

Here, the "rhythm" implies such a structure that a strength and a weakness of a tone are periodically repeated in a certain music composition (namely, a beat).

A plurality of music compositions are outputted to the inside of the club as an editor for editing the combination of music compositions (hereafter, this editor is referred to as a "disc jockey") selects and synthesizes the music compositions respectively outputted from a plurality of reproducing apparatuses, in the actual spot or scene.

At this time, as an actual method of continuously reproducing and outputting two music compositions, the disc jockey drives two reproducing apparatuses, for example, by using the following procedure.

(i) While a first reproducing apparatus is used to reproduce and output one music composition from an information record medium such as an optical disc, a second reproducing apparatus is used to reproduce another music composition. Then, another music composition is listened to by the disc jockey by using a headphone or the like without outputting it into the inside of the club.

(ii) Then, a reproducing speed of the second reproducing apparatus is set such that, while another music composition is listened to by the disc jockey, the time period required for one beat in another music composition coincides with that in the one music composition (which is currently being reproduced and outputted). Then, a head portion of another music composition is searched (i.e., a so-called "head search" is performed).

(iii) When the one music composition which is currently being reproduced and outputted approaches an end thereof, a reproduction level of the one music composition is gradually dropped (a so-called "fade-out" is performed). Along with this, another music composition is reproduced from the head portion thereof while it is matched with the beat timing of the one music composition. Then, the reproduction level for another music composition is gradually increased (a so-called "fade-in" is performed), so that another music composition is outputted to the inside of the club.

(iv) When the reproduction level of another music composition becomes equal to a proper reproduction level, the reproduction of the one music composition, which has been reproduced and outputted, is stopped. Then, the first reproducing apparatus is ready for further another music composition to be continuously reproduced after another music composition which is currently being reproduced and outputted.

After that, as the disc jockey repeats the procedure (i) to the procedure (iv), the plurality of different music compositions can be reproduced continuously without the intermittence while the rhythm is maintained constant.

In the above-mentioned series of operations, the "beat" implies each portion of the strengths and weaknesses of the tones repeated in the cycles of the rhythms of each music composition, and it is composed of a strong beat and a weak beat. The "strong beat" implies a strong portion of the bar or beat in a flow of the rhythm (typically, this portion corresponds to a first beat on a staff, and this is a portion represented by a motion of a conductor in which a baton is brought down from top). Moreover, the "weak beat" implies a weak portion of the bar or beat in the flow of the rhythm.

At this time, for example, a double time uses a strong beat and a weak beat. A triple time uses a strong beat, a weak beat and a weak beat. A quadruple time uses a strong beat, a weak beat, a middle beat and a weak beat. Thus, in the continuous reproduction of the music compositions, it is desirable to start the reproduction of another music composition such that the timings of the strong beats of the one and another music compositions to be continuously reproduced are coincident with each other.

On the other hand, as a method of mechanically carrying out such a continuous reproduction, there is a connection reproduction method using a memory, for example, as disclosed in Japanese Utility Model Application Laid Open Publication No. Sho. 60-166892.

However, in the case where the above mentioned continuous reproduction is performed manually by the disc jockey, an operation on a large number of switches etc., is required in fact. This results in such a problem that the reproduction output cannot be appropriately continued unless the disc jockey is a well trained and experienced person for the operation.

This point leads to a problem that the business as the club cannot be maintained if there is no such a well trained and experienced disc jockey.

On the other hand, according to the above mentioned method using the mechanically carry out the connection reproduction, there may be a case that the connection portions of two music compositions cannot be connected while maintaining the rhythm of those music compositions, since the disclosed technique does not consider the timing of the beat or the time period required for one beat.

SUMMARY OF THE INVENTION

The present invention is proposed in view of the above mentioned problems. It is therefore an object of the present invention to provide a method of and an apparatus for reproducing audio information, which can connect and reproduce two music compositions rhythmically without intermittence through a relatively simple operation done by a person, who is not well trained or experienced for the connection reproduction, as well as a program storage device for storing a program such as an information record medium and a computer data signal embodied in a carrier wave, which enable a computer to function as such an audio information reproducing apparatus.

The above object of the present invention can be achieved by a first apparatus for reproducing audio information, which reproduces one audio information and reproduces another audio information after said one audio information. The first apparatus is provided with: a detecting device such as a BPM (Beat Per Minute) detector etc., for detecting one time period required for one beat of said one audio information, and also detecting another time period for one beat of said another audio information; and a reproducing device such as a sub CPU (Central Processing Unit) etc., for reproducing said another audio information continuously to said one audio information while controlling the detected another time period to be coincident with the detected one time period.

According to the first apparatus, while said another time period is controlled to be coincident with said one time period, said another audio information is reproduced continuously to said one audio information. Thus, it is possible to continuously reproduce each audio information while making the rhythms thereof consistent by a relatively simple operation.

Therefore, even by an operator, who is not familiar with the operation of reproducing each audio information while making the rhythms thereof consistent, it is possible to continuously reproduce each audio information with a good rhythmic sense by a relatively simple operation.

The above object of the present invention can be also achieved by a second apparatus for reproducing audio information, which reproduces one audio information and reproduces another audio information after said one audio information. The second apparatus is provided with: a detecting device such as a BPM detector etc., for detecting one beat timing which is a timing of a beat of said one audio information and also detecting another beat timing which is a timing of a beat of said another audio information; and a reproducing device such as a sub CPU etc., for reproducing said another audio information continuously to said one audio information while controlling the detected another beat timing to be coincident with the detected one beat timing.

According to the second apparatus, while said another beat timing is controlled to be coincident with said one beat timing, said another audio information is reproduced continuously to said one audio information. Thus, it is possible to continuously reproduce each audio information while making the rhythms thereof consistent by a relatively simple operation.

Therefore, even by an operator, who is not familiar with the operation of reproducing each audio information while making the rhythms thereof consistent, it is possible to continuously reproduce each audio information with a good rhythmic sense by a relatively simple operation.

In one aspect of the second apparatus of the present invention, the detecting device detects a timing of a strong beat of said one audio information as said one beat timing, and also detects a timing of a strong beat of said another audio information as said another beat timing.

According to this aspect, since the strong beat timings are controlled to be coincident between said one audio information and said another audio information, it is possible to continuously reproduce each audio information while making the rhythms thereof more consistent by a relatively simple operation.

The above object of the present invention can be also achieved by a third apparatus for reproducing audio information, which reproduces one audio information and reproduces another audio information after said one audio information. The third apparatus is provided with: a first detecting device such as a BPM detector etc., for detecting one time period required for one beat of said one audio information, and also detecting another time period for one beat of said another audio information; a second detecting device such as a BPM detector etc., for detecting one beat timing which is a timing of a beat of said one audio information and also detecting another beat timing which is a timing of a beat of said another audio information; and a reproducing device such as a sub CPU etc., for reproducing said another audio information continuously to said one audio information while controlling the detected another time period to be coincident with the detected one time period and also controlling the detected another beat timing to be coincident with the detected one beat timing.

According to the third apparatus, while said another time period is controlled to be coincident with said one time period and said another beat timing is controlled to be coincident with said one beat timing, said another audio information is reproduced continuously to said one audio information. Thus, it is possible to continuously reproduce each audio information while making the rhythms thereof consistent by a relatively simple operation.

Therefore, even by an operator, who is not familiar with the operation of reproducing each audio information while making the rhythms thereof consistent, it is possible to continuously reproduce each audio information with a good rhythmic sense by a relatively simple operation.

In one aspect of the first or third apparatus of the present invention, the reproducing device reproduces said another audio information as it is continuously to said one audio information in case that the detecting device cannot detect said another time period.

According to this aspect, when said another time period cannot be detected, said another audio information is reproduced as it is (i.e., while said another time period is not controlled) continuously to said one audio information. Thus, it is possible to prevent the continuous reproduction from being interrupted between said one audio information and said another audio information since said another time period cannot be detected.

In another aspect of the second or third apparatus of the present invention, the reproducing device reproduces said another audio information as it is from a predetermined timing set in advance continuously to said one audio information in case that the detecting device cannot detect said another beat timing.

According to this aspect, when said another beat timing cannot be detected, said another audio information is reproduced as it is (i.e., while said another beat timing is not controlled) from the predetermined timing continuously to said one audio information. Thus, it is possible to prevent the continuous reproduction from being interrupted between said one audio information and said another audio information since said another beat timing cannot be detected.

The above object can be also achieved by a first method of reproducing audio information, which reproduces one audio information and reproduces another audio information after said one audio information. The first method is provided with: a detecting process of detecting one time period required for one beat of said one audio information, and also detecting another time period for one beat of said another audio information; and a reproducing process of reproducing said another audio information continuously to said one audio information while controlling the detected another time period to be coincident with the detected one time period.

According to the first method, while said another time period is controlled to be coincident with said one time period, said another audio information is reproduced continuously to said one audio information. Thus, it is possible to continuously reproduce each audio information while making the rhythms thereof consistent by a relatively simple operation.

Therefore, even by an operator, who is not familiar with the operation of reproducing each audio information while making the rhythms thereof consistent, it is possible to continuously reproduce each audio information with a good rhythmic sense by a relatively simple operation.

The above object of the present invention can be also achieved by a second method of reproducing audio information, which reproduces one audio information and reproduces another audio information after said one audio information. The second method is provided with: a detecting process of detecting one beat timing which is a timing of a beat of said one audio information and also detecting another beat timing which is a timing of a beat of said another audio information; and a reproducing process of reproducing said another audio information continuously to said one audio information while controlling the detected another beat timing to be coincident with the detected one beat timing.

According to the second method, while said another beat timing is controlled to be coincident with said one beat timing, said another audio information is reproduced continuously to said one audio information. Thus, it is possible to continuously reproduce each audio information while making the rhythms thereof consistent by a relatively simple operation.

Therefore, even by an operator, who is not familiar with the operation of reproducing each audio information while making the rhythms thereof consistent, it is possible to continuously reproduce each audio information with a good rhythmic sense by a relatively simple operation.

The above object of the present invention can be also achieved by a first program storage device readable by a computer, tangibly embodying a program of instructions executable by the computer to perform processes to reproduce one audio information and reproduce another audio information after said one audio information. The processes include: a detecting process of detecting one time period required for one beat of said one audio information, and also detecting another time period for one beat of said another audio information; and a reproducing process of reproducing said another audio information continuously to said one audio information while controlling the detected another time period to be coincident with the detected one time period.

According to the first program storage device of the present invention, as the computer reads in and executes the program stored therein, it is possible to realize the above described first apparatus for reproducing the audio information of the present invention on the computer.

The above object of the present invention can be also achieved by a second program storage device readable by a computer, tangibly embodying a program of instructions executable by the computer to perform processes to reproduce one audio information and reproduce another audio information after said one audio information. The processes include: a detecting process of detecting one beat timing which is a timing of a beat of said one audio information and also detecting another beat timing which is a timing of a beat of said another audio information; and a reproducing process of reproducing said another audio information continuously to said one audio information while controlling the detected another beat timing to be coincident with the detected one beat timing.

According to the second program storage device of the present invention, as the computer reads in and executes the program stored therein, it is possible to realize the above described second apparatus for reproducing the audio information of the present invention on the computer.

The above object of the present invention can be also achieved by a first computer data signal embodied in a carrier wave and representing a series of instructions which cause a computer to perform processes to reproduce one audio information and reproduce another audio information after said one audio information. The processes include: a detecting process of detecting one time period required for one beat of said one audio information, and also detecting another time period for one beat of said another audio information; and a reproducing process of reproducing said another audio information continuously to said one audio information while controlling the detected another time period to be coincident with the detected one time period.

According to the first computer data signal embodied in the carrier wave of the present invention, as the computer downloads and executes the program in the computer data signal, it is possible to realize the above described first apparatus for reproducing the audio information of the present invention on the computer.

The above object of the present invention can be also achieved by a second computer data signal embodied in a carrier wave and representing a series of instructions which cause a computer to perform processes to reproduce one audio information and reproduce another audio information after said one audio information. The processes include: a detecting process of detecting one beat timing which is a timing of a beat of said one audio information and also detecting another beat timing which is a timing of a beat of said another audio information; and a reproducing process of reproducing said another audio information continuously to said one audio information while controlling the detected another beat timing to be coincident with the detected one beat timing.

According to the second computer data signal embodied in the carrier wave of the present invention, as the computer downloads and executes the program in the computer data signal, it is possible to realize the above described second apparatus for reproducing the audio information of the present invention on the computer.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Preferred embodiments of the present invention will be explained below with reference to the drawings. In the following embodiments, the present invention is applied to an audio information outputting apparatus, which is intended to play the music compositions in the above-mentioned club and which includes a mixer for superimposing the music compositions outputted by a plurality of audio players to thereby generate the music composition for playing.

Figure 1:
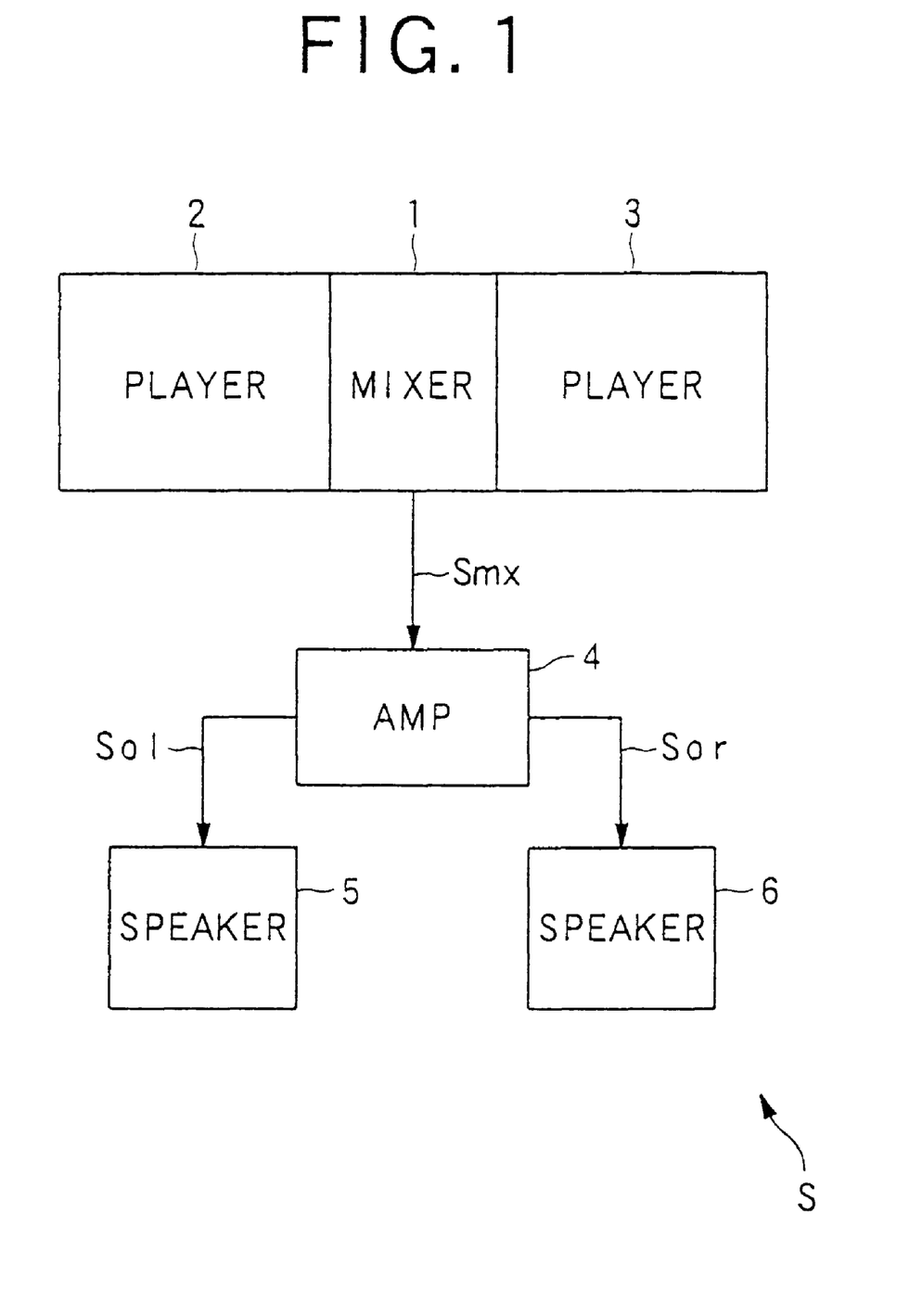
FIG. 1 is a block diagram showing a schematic configuration of an audio information outputting apparatus as an embodiment of the present invention.

At first, the whole configuration and operation of the audio information outputting apparatus according to the embodiment is described with reference to FIG. 1. FIG. 1 is a block diagram showing the schematic configuration of the audio information outputting apparatus as the embodiment.

In FIG. 1, an audio information outputting apparatus S is provided with a mixer 1, players 2 and 3, an amplifier 4 serving as one example of an outputting device and speakers 5 and 6.

At this time, the players 2 and 3 may be analog players for respectively reproducing so-called analog records, or may be digital players for digitally reproducing information on a CD (Compact Discs), a DVD or the like.

Also; the mixer 1 and the players 2 and 3 are actually integrally mounted in an audio rack or the like.

Next, the schematic operations of the respective constitutional elements are explained.

At first, the players 2 and 3 respectively reproduce the analog records or the CDs etc., and respectively generate music composition signals including the plurality of music compositions, and then output them to the mixer 1.

Then, the mixer 1 synthesizes the respectively generated music composition signals in accordance with the operation of the disc jockey, generates a mixer signal Smx, and outputs it to the amplifier 4.

After that, the amplifier 4 amplifiers the respective music compositions included in the mixer signal Smx, generates a left signal Sol including audio information (including both of sound or tone information of an instrument or the like, and voice information of a human song or the like) to be included in a left channel and a right signal Sor including audio information to be included in a right channel, respectively, and outputs them to the speaker 5 for the left channel and the speaker 6 for the right channel, respectively.

By those operations, the speakers 5 and 6 output the audio information, respectively included in the left signal Sol and the right signal Sor corresponding to the speakers 5 and 6, as the sound or tone to the inside of the club.

Figure 2:
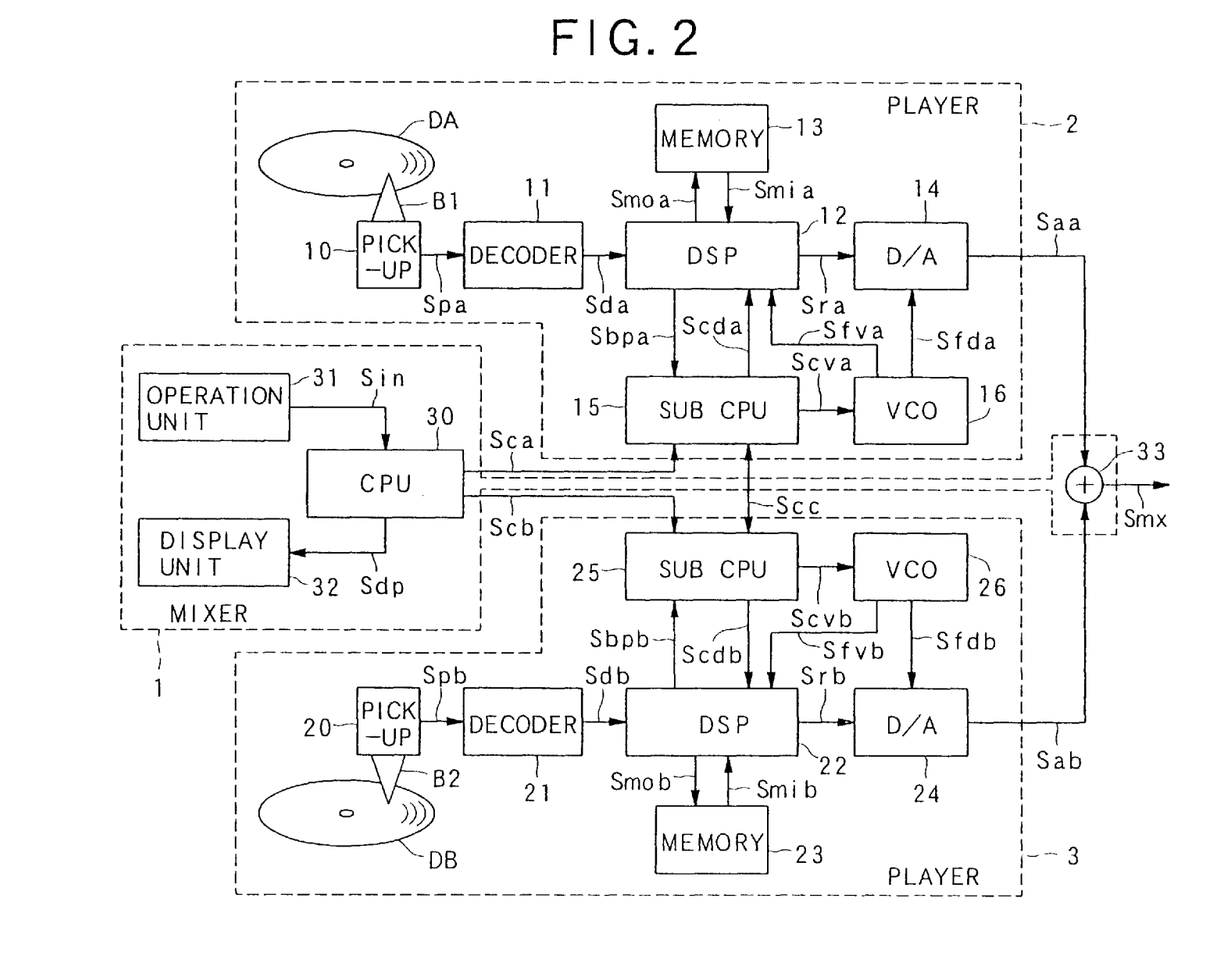
FIG. 2 is a block diagram showing detailed configurations of a mixer and respective players in the embodiment.

Next, the detailed configurations and operations of the mixer 1 and the players 2 and 3 according to the present embodiment are explained with reference to FIG. 2. FIG. 2 is a block diagram showing the detailed configurations of the mixer 1 and the players 2 and 3 in the embodiment.

At first, as shown in FIG. 2, the player 2 for reproducing an optical disc DA, which is a CD or the like and on which a music composition to be reproduced is recorded, is provided with: an optical pickup 10; a decoder 11; a DSP (Digital Signal Processor) 12; a memory 13; a D/A (Digital/Analog) converter 14; a sub CPU 15 serving as one example of a reproducing device and a computer; and a VCO (Voltage Controlled Oscillator) 16.

On the other hand, the player 3 for reproducing an optical disc DB, which is a CD or the like and on which a music composition to be reproduced is recorded, has the configuration similar to that of the player 2. Actually, the player 3 is provided with: an optical pickup 20; a decoder 21; a DSP 22; a memory 23; a D/A converter 24; a sub CPU 25 serving as one example of a reproducing device and a computer; and a VCO 26.

The mixer 1 is provided with: a CPU 30 serving as one example of a computer; an operation unit 31; a display unit 32; and an adder 33.

Next, the operations of the respective constitutional elements will be described below. In the following description, the players 2 and 3 are operated under the substantially same conditions. So, the operations of the players 2 and 3 are commonly described.

In case that the player 2 or 3 reproduces a dance music composition from the optical disc DA or DB, the optical pickup 10 or 20 firstly drives a light source (not shown) including a semiconductor laser or the like to thereby emit a light beam B1 or B2. Then, the reception of the reflection light from the optical disc DA or DB enables the generation of a reproduction signal Spa or Spb that is an RF (Radio Frequency) signal corresponding to the music composition recorded on the optical disc DA or Db. The reproduction signal Spa or Spb is outputted to the decoder 11 or 21.

Accordingly, the decoder 11 or 21 applies a wave form re-shaping process, a decoding process, an amplifying process and the like onto the inputted reproduction signal Spa or Spb, to thereby digitize it and generate a digital decode signal Sda or Sdb. Then, the decoder 11 or 21 outputs the generated digital decode signal Sda or Sdb to the DSP 12 or 22.

Incidentally, the generation of the reproduction signal Spa or Spb in the optical pickup 10 or 20 and the generation of the digital decode signal Sda or Sdb in the decoder 11 or 21 are executed at a high speed, for example, such as a quadruple speed (i.e., four times speed) or the like. Thus, the generated digital decode signal Sda or Sdb is outputted to the DSP 12 or 22 at the quadruple speed or the like.

Then, the DSP 12 or 22 detects a later-described BPM (Beat Per Minutes) value of the music composition to be reproduced, which is included in the inputted digital decode signal Sda or Sdb, to thereby generate a BMP signal Sbpa or Sbpb indicative of the BMP value. Then, the DSP 12 or 22 outputs the generated BMP signal Sbpa or Sbpb to the sub CPU 15 or 25, and also applies later-described various processes onto the digital decode signal Sda or Sdb in accordance with a later-described control signal Scda or Scdb from the sub CPU 15 or 25 to thereby generate a music composition signal Sra or Srb, and output it to the D/A converter 14 or 24.

At this time, the DSP 12 or 22 carries out these processes while transiently storing the data necessary for these processes as a memory signal Smoa or Smob into the memory 13 or 23, and further reading out the stored data as a memory signal Smia or Smib from the memory 13 or 23. Here, one series of processes from the detection of the reproduction signal Spa or Spb of the optical disc DA or DB to the storage of the memory signal Smoa or Smob into the memory 13 or 23 are performed at a high speed such as a quadruple speed (i.e., four times speed). On the other hand, the processes after reading out of the memory signal Smia or Smib from the memory 13 or 23 are performed at a low speed or a normal speed (i.e., one time speed).

Then, the D/A converter 14 or 24 converts the processed music composition signal Sra or Srb into an analog signal to thereby generate an analog music composition signal Saa or Sab and output it to the adder 33.

At this time, the reading out speed at which the music composition signal Sra or Srb is read out from the DSP 12 or 22 and the digital/analog conversion frequency in the D/A converter 14 or 24 (i.e., the digital/analog conversion speed) are controlled in accordance with speed control signals Sfva and Sfda from the VCO 16 or speed control signals Sfvb and Sfdb from the VCO 26, respectively. Actually, even if the input speed of the digital decode signal Sda or Sdb to the DSP 12 or 22 is as high as the quadruple speed, each of the reading out speed from the DSP 12 or 22 and the digital/analog conversion speed in the D/A converter 14 or 24 is controlled to be a normal speed (i.e., one time speed).

Then, the adder 33 adds the analog music composition signals Saa and Sab to thereby generate the mixer signal Smx as the output of the mixer 1, and output it to the amplifier 4 in FIG. 1.

On the other hand, in the above-mentioned processes of the respective constitutional elements, the sub CPU 15 or 25 generates and outputs the control signal Scda or Scdb to the DSP 12 or 22 so as to execute the later-described operation for the continuous reproductions of the music compositions, depending upon the control signal Sca or Scb from the CPU 30 and the BMP signal Sbpa or Sbpb from the DSP 12 or 22 while sending and receiving a control signal Scc between each other.

In parallel with those operations, the sub CPU 15 or 25 generates a control signal Scva or Scvb to control the operation of the VCO 16 or 26, and outputs it to the VCO 16 or 26, respectively. Thus, the VCO 16 generates and outputs the speed control signals Sfva and Sfda, respectively to the DSP 12 and the D/A converter 14, so as to control the output speed of the music composition signal Sra from the DSP 12 and the digital/analog conversion frequency of the D/A converter 14 as mentioned above. The VCO 26 generates and outputs the speed control signals Sfvb and Sfdb, respectively to the DSP 22 and the D/A converter 24, so as to control the output speed of the music composition signal Srb from the DSP 22 and the digital/analog conversion frequency of the D/A converter 24 as mentioned above.

Moreover, the CPU 30 generates and outputs the control signal Sca or Scb to the sub CPU 15 or 25, so as to make the sub CPU 15 or 25 execute the above-mentioned reproduction control.

At this time, the operation for specifying the operation of the mixer 1 and the players 2 and 3 through the CPU 30 is executed by the operation unit 31. An operation signal Sin corresponding to this operation of specifying is outputted from the operation unit 31 to the CPU 30. Then, the CPU 30 carries out the above-mentioned controls based on the operation signal Sin.

Moreover, the information with regard to the operations of the mixer 1 and the players 2 and 3 controlled by the CPU 30 (actually, the detected respective BMP values and the like) is outputted from the CPU 30 as a display signal Sdp to the display unit 32, and is displayed on the display unit 32 for the disc jockey and the like.

Next, the detailed configurations and operations of the DSP 12 or 22 and the memory 13 or 23 will be described with reference to FIG. 3 together with their related constitutional elements. The DSP 12 and 22 have the configurations similar to each other and also carry out the operations similar to each other, while the memories 13 and 23 have the configurations similar to each other, and also carry out the operations similar to each other. Thus, the detailed configurations and operations of the DSP 12 and the memory 13 among them are respectively described in the following explanations.

Figure 3:
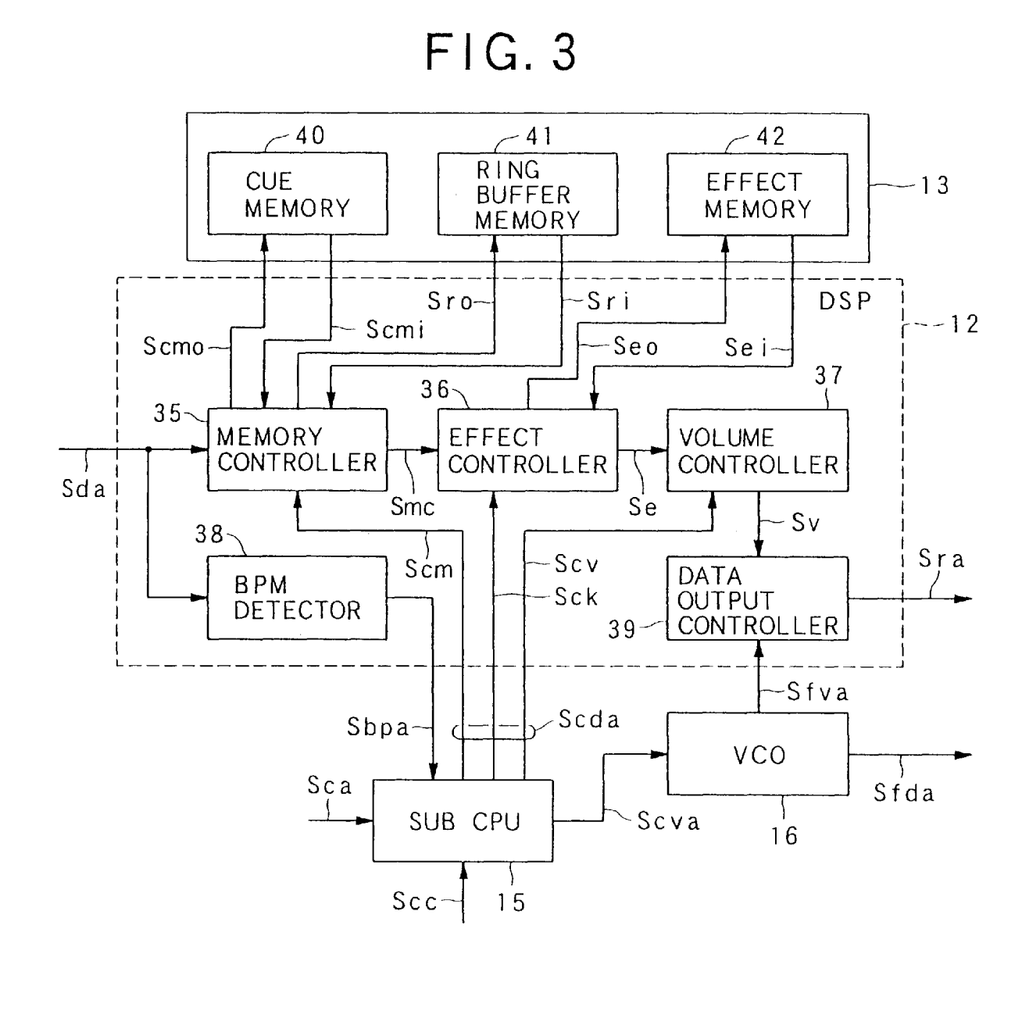
FIG. 3 is a block diagram showing a detailed configuration of each DSP in the embodiment.

As shown in FIG. 3, the DSP 12 is provided with: a memory controller 35; an effect controller 36; a volume controller 37; a BPM detector 38 serving as one example of a detecting device, a first detecting device and a second detecting device; and a data output controller 39. The DSP 12 is actually formed as one LSI (Large Scale Integrated circuit). These controllers are respectively defined as respective functions in the LSI chip.

Also, the memory 13 is provided with: a cue memory 40; a ring buffer memory 41; and an effect memory 42.

Here, each of the cue memory 40, the ring buffer memory 41 and the effect memory 42 is defined as a part of a memory area in the memory 13.

Next, the operations of the respective portions will be described.

At first, the BPM detector 38 detects the number of beats per minute of the music composition included in the inputted digital decode signal Sda (hereafter, the number of beats per minute is merely referred to as a "BPM value") to thereby generate the BPM signal Sbpa and output it to the sub CPU 15.

At this time, a process of detecting the BPM value in the BPM detector 38 is actually a process of continuing to detect an interval between the beats of the music composition for a certain time duration, and detecting the BPM value in accordance with the statistic of the beat intervals detected within the certain time duration. For example, such a process of automatically detecting the BPM value is performed by using a time counter as following. Namely, time-counting of the time counter is started at one time point when the level of a predetermined frequency component of the inputted audio signal exceeds a predetermined threshold level, and is stopped at another time point when the level of the frequency component exceed the threshold level again after a predetermined time duration has elapsed from the one time point. Then, the time-counted value is converted to the number of the beats for a predetermined unit time period to thereby obtain the BPM value. Such a process of automatically detecting the BPM value by using a time counter is known and is disclosed in a range between the paragraph numbers [0010] to [0027] and a range from FIG. 1 to FIG. 9 in Japanese Patent Application Laid Open Publication No. Hei. 8-201542, for example.

In other words, the process of detecting the BPM value is a process of detecting a beat timing, which is defined as a timing when a beat of each music composition (including both of the strong beat and the weak beat) is generated.

On the other hand, the cue memory 40 within the memory 13 is a memory for storing therein in advance the digital decode signal Sda corresponding to the head portion of a music composition to be next reproduced by the player 2, in order to compensate a transient interruption of the sound or tone due to the time required for optically reading out the data from the optical disc DA (occurring when a reproduction of a new music composition is started). Actually, for example, the digital decode signal Sda corresponding to two seconds at the head portion of the music composition to be next reproduced as the memory amount of the digital decode signal Sda is stored into the cue memory 40.

Next, the ring buffer memory 41 within the memory 13 is a memory for transiently storing therein the digital decode signal Sda corresponding to the music composition to be currently reproduced. Actually, the digital decode signal Sda is stored sequentially from the head thereof. Then, after all the memory areas within the ring buffer memory 41 are filled with the digital decode signals Sda, rewriting to replace the storage content by the digital decode signal Sda to be next stored from the head of the memory areas is repeated cyclically for the digital decode signal Sda corresponding to one music composition on the whole.

The effect memory 42 within the memory 13 is used to store therein the digital decode signal Sda, as the occasion demands, when the condition of the connection between the music compositions in the continuous reproduction of the music compositions is changed.

With respect to those memories, in accordance with a control signal Scm included in the control signal Scda outputted by the sub CPU 15, the memory controller 35 outputs and stored the inputted digital decode signal Sda into the cue memory 40 as a memory signal Scmo, as the occasion demands. Also, the memory controller 35 outputs and stores it into the ring buffer memory 41 as a memory signal Sro.

Moreover, the memory controller 35 reads out the digital decode signal Sda stored in the cue memory 40 or the ring buffer memory 41, as a memory signal Scmi or Sri, respectively as the occasion demands, and then outputs it as a reading out signal Smc to the effect controller 36.

Next, in accordance with a control signal Sck included in the control signal Scda outputted by the sub CPU 15, the effect controller 36 outputs and stores the inputted reading out signal Smc as a memory signal Seo into the effect memory 42, as the occasion demands. Also, while reading it out as a memory signal Sei from the effect memory 42, the effect controller 36 applies a process required to change the above-mentioned connection condition between the music compositions (hereafter, referred to as a "connection pattern") onto the reading out signal Smc, to thereby generate an effect signal Se and output it to the volume controller 37.

Incidentally, the effect signal Se is generated only when the connection between the music compositions is to be done. Except for the timing to do such a connection, the inputted reading out signal Smc (in other words, the digital decode signal Sda) is outputted to the volume controller 37 as it is.

Each of the memory signals Scmo, Sro, and Seo corresponds to the memory signal Smoa in FIG. 2. Each of the memory signals Scmi, Sri and Sei corresponds to the memory signal Smia in FIG. 2.

Next, the volume controller 37 adjusts a level of the effect signal Se or the reading out signal Smc by using a conventional method in accordance with a control signal Scv included in the control signal Scda outputted from the sub CPU 15, to thereby generate a level adjusted signal Sv and output it to the data output controller 39.

Then, the data output controller 39 controls an output rate (in other words, the BPM value (or tempo) of the music composition included in the music composition signal Sra) when the inputted level adjusted signal Sv is outputted as the music composition signal Sra as described later, in accordance with the speed control signal Sfva from the VCO 16, to thereby generate the music composition signal Sra at the controlled output rate and output it to the D/A converter 14 in FIG. 2. At this time, actually, the data output controller 39 controls the frequency of a clock signal for controlling the output rate of the music composition signal Sra, to a value indicated by the speed control signal Sfva, so as to control the output rate of the music composition signal Sra.

Figure 4:
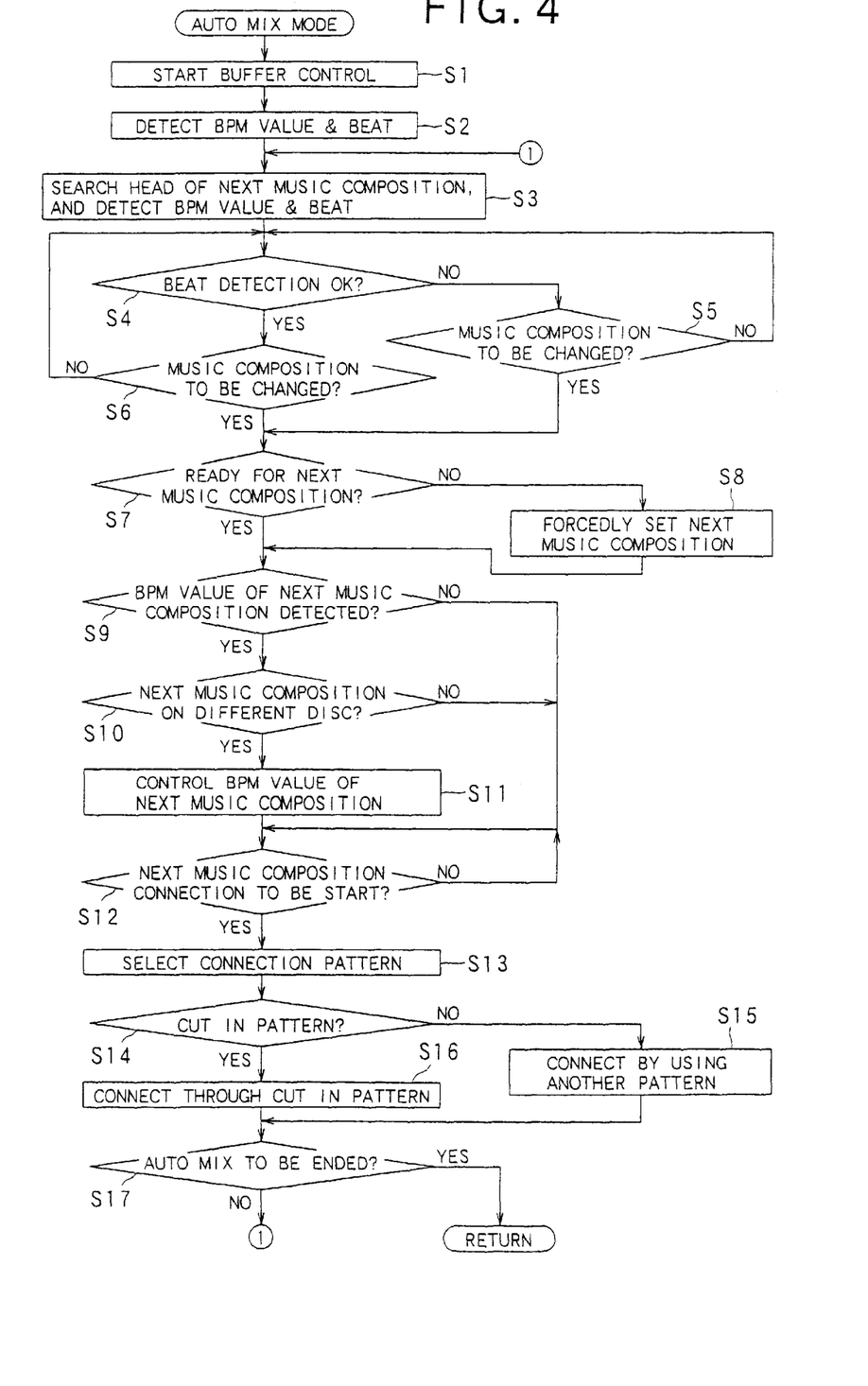
FIG. 4 is a flowchart showing a reproduction controlling process in the embodiment.
Figure 5A:
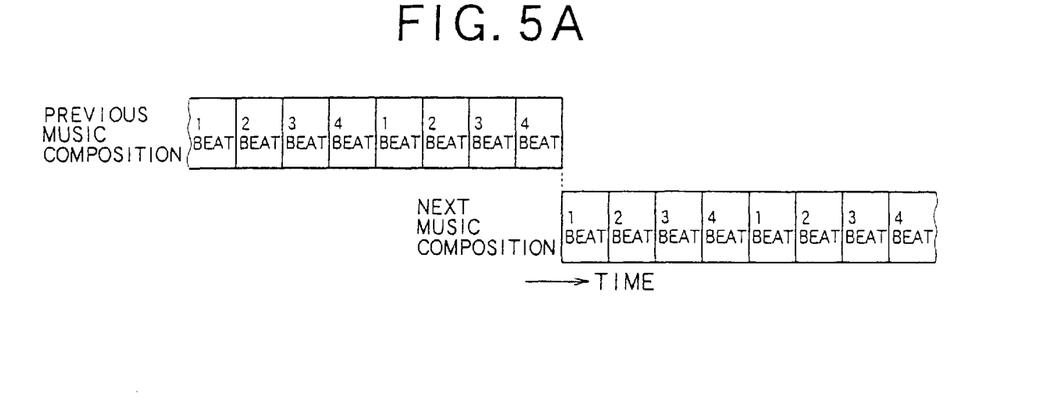
FIG. 5A is a diagram showing a connection pattern between music compositions as well as respective beats thereof in the embodiment.

Next, the process of controlling the continuous reproduction of the music compositions according to the embodiment executed by the above-mentioned respective constitutional elements will be described with reference to FIGS. 4, 5A and 5B. FIG. 4 is a flowchart showing the reproduction control process, and FIGS. 5A and 5B are diagrams showing the connection pattern between the music compositions.

Figure 5B:
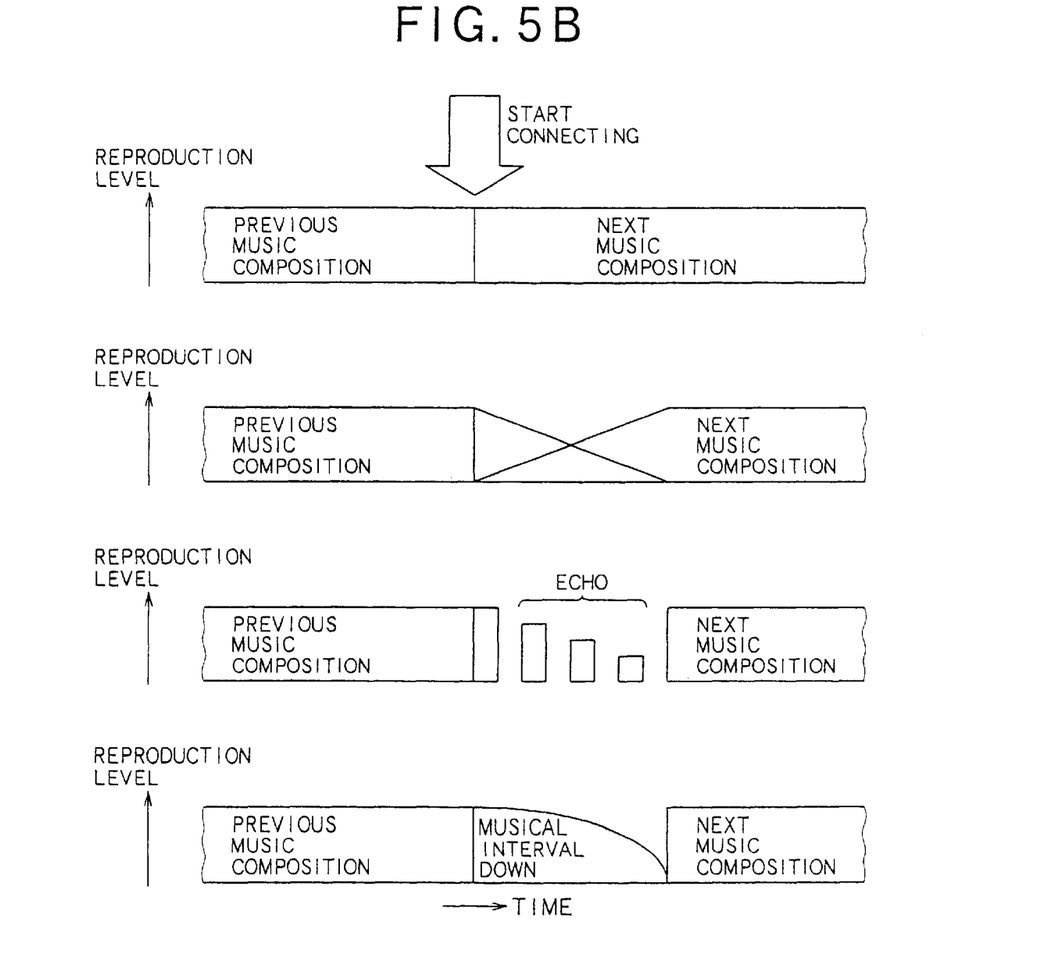
FIG. 5B is a diagram showing various connection patterns between the music compositions in the embodiment.

The longitudinal length of each stage in FIG. 5B denotes a reproduction level of each music composition.

Moreover, in the process of controlling the continuous reproduction shown in FIG. 4, it is assumed that the specification of the music compositions to be continuously reproduced and the specification of the order of the music compositions are executed in advance by the operation unit 31 and that the contents of these specifications are recognized by the CPU 30 and the sub CPU 15 or 25.

Furthermore, it is assumed that the process of controlling the continuous reproduction shown in FIG. 4 is performed by the CPU 30 and the sub CPU 15 or 25 in cooperation with each other.

As shown in FIG. 4, in the process of controlling the continuous reproduction between the music compositions in the present embodiment, when a mode of continuously reproducing a plurality of music compositions automatically (hereinafter, this mode is referred to as an "auto mix mode") is specified through the operation unit 31, the memory controller 35 starts the processes of generating the digital decode signal Sda corresponding to the head portion of a music composition to be firstly reproduced, and storing it into the cue memory 40. Also the memory controller 35 starts the process of storing the digital decode signals Sda corresponding to the portions after the head portion into the ring buffer memory 41 in the reproduction order. Moreover, the memory controller 35 generates the music composition signal Sra or Srb, and continues to output the corresponding music composition (Step S1).

Next, the BPM value in the music composition currently being reproduced and outputted is detected, and the beat timing of the music composition is also detected (Step S2).

The processes of detecting the beat timing and the BPM value at the step S2 are done by using the memory 13 or 23 etc., within the player, which is currently reproducing the music composition.

Next, the head portion of the music composition, which is to be reproduced continuously after the music composition currently being reproduced and outputted, is searched (i.e., a so-called "head search" is performed) on the optical disc DA or DB (hereafter, this music composition being searched is referred to as a "next music composition"). The detections of the beat timing and the BPM value of the next music composition are respectively performed (Step S3).

The processes of carrying out the head search of the next music composition and detecting the BPM value at the step S3 are done by using the memory 13 or 23 etc., within the player, which is currently reproducing the music composition, if the next music composition is recorded on the optical disc DA or DB, on which the music composition currently being reproduced and outputted is recorded. On the contrary, if the next music composition is recorded on the optical disc DB or DA different from the optical disc DA or DB, on which the music composition currently being reproduced and outputted is recorded, the processes at the step S3 are done by using the memory 23 or 13 etc., within the player different from the player, which is currently reproducing the music composition.

Next, it is judged whether or not the beat timing of the music composition that is currently reproduced and outputted has been actually detected at the step S2 (Step S4). If the beat timing has never been detected (Step S4: NO), it is further judged whether or not the timing when the next music composition is to be outputted has just come (Step S5).

The judgment at the step S5 is done in accordance with whether or not a predetermined time duration has elapsed from the start of the output of the music composition currently being reproduced and outputted, in the normal process of controlling the continuous reproduction. On the other hand, for example, if a continuous reproduction for only initial one minute in each music composition is set in advance, the judgment at the step S5 is done in accordance with whether or not one minute has elapsed from the start of the output of the music composition currently being reproduced and outputted.

Then, if the timing of reproducing and outputting the next music composition has never come in the judgment at the step S5 (Step S5: NO), the operational flow returns back to the step S4, so that it is checked whether or not the beat timing has been detected while continuing to reproduce the current music composition. On the other hand, if the timing of reproducing and outputting the next music composition has just come (Step S5: YES), the operational flow proceeds to a step S7 as it is.

On the other hand, if the beat timing in the music composition currently being reproduced and outputted is normally detected in the judgment at the step S4 (Step S4: YES), it is judged whether or not the timing of reproducing and outputting the next music composition has come, in accordance with a count value of the detected beat timing, similarly to the step S5 (Step S6).

In the judgment at the step S6, it is judged whether or not a predetermined number of beats has been counted from the start of the output of the music composition currently being reproduced and outputted, in accordance with the count value of the detected beat timing, in the normal process of controlling the continuous reproduction. On the other hand, if the continuous reproduction for only initial one minute in each music composition is set in advance, it is judged whether or not the amount corresponding to, for example, 128 beats (which is a length corresponding to approximately one minute in a case that a length of one beat is 0.5 second for a dance music composition of a quadruple time) has been counted from the start of the output of the music composition currently being reproduced and outputted.

If the timing of reproducing and outputting the next music composition has never come yet in the judgment at the step S6 (Step S6: NO), the operational flow returns back to the step S4, and continues to reproduce the current music composition. On the other hand, if the timing of reproducing and outputting the next music composition has just come (Step S6: YES), it is next judged whether or not a preparation to start reproducing the next music composition is completed (actually, whether or not the digital decode signal Sda corresponding to the head portion of the next music composition is stored in the cue memory 40) (Step S7).

Then, if the preparation is completed (Step S7: YES), it is next judged whether or not the BPM value of the next music composition has been actually detected at the step S3 (Step S9) if it is not detected (Step S9: NO), the operational flow proceeds to a step S12 in order to start reproducing the next music composition without considering the connectivity of rhythm. On the other hand, if the BPM value of the next music composition has been actually detected (Step S9: YES), it is next judged whether or not the music composition, which is to be reproduced as the next music composition, is recorded on the optical disc DA or DB different from that on which the music composition currently reproduced and outputted is recorded (Step S10).

In the judgment at the step S10, if the next music composition is not recorded on the optical disc DA or DB different from that on which the music composition currently being reproduced and outputted is recorded i.e., recorded on the same optical disc DA or DB (Step S10: NO), the operational flow proceeds to the step S12 in order to start reproducing the next music composition. On the other hand, if the next music composition is recorded on the optical disc DA or DB different from that on which the music composition currently being reproduced and outputted is recorded (Step S10; YES), the BPM value of the next music composition recorded on the different optical disc DB or DA is set so as to coincide with the BPM value of the music composition currently being reproduced and outputted (Step S11).

The process at the step S11 is executed by the data output controller 39 within the player which is to reproduce the next music composition.

When the setting of the BPM value of the next music composition is ended, it is next judged whether or not the beat timing when the reproduction of the next music composition is to be started has come (Step S12).

In this step S12, if the beat timing of the music composition currently being reproduced and outputted has been detected, it is judged so as to start the reproduction output of the next music composition immediately after the elapse of the time corresponding to one beat from the start of the final beat (for example, a 128-th beat) of the music composition currently reproduced and outputted (e.g., start it at the timing of the 129-th beat) (refer to FIG. 5A). In this case, the digital decode signal Sda is read out and outputted at a corresponding timing from the cue memory 40 which stores the head portion of the next music composition.

Also at the step S12, if the beat timing of the music composition currently being reproduced and outputted has never been detected, it is judged so as to start reproducing the next music composition by reading out the content of the cue memory 40 corresponding to the next music composition, immediately after the end of the current music composition.

In the judgment at the step S12, if the beat timing when the reproduction of the next music composition is to be started has never come yet (Step S12: NO), the operational flow waits for the beat timing. On the other hand, if the beat timing has just come (Step S12: YES), the connection pattern is selected in accordance with a predetermined procedure in case that the next music composition is to be actually connected to the music composition currently being reproduced and outputted (Step S13).

At this time, at the step S13, one connection pattern is selected from, for example, four kinds of connection patterns as shown in FIG. 5B.

The respective connection patterns shown in FIG. 5B are explained here. At first, a connection pattern shown on a top stage of FIG. 5B is referred to as a so-called "cut in pattern", which is a connection pattern to start the reproduction output of the next music composition simultaneously with an end of a previous music composition (i.e., the music composition currently being reproduced and outputted). In this cut in pattern, the reproduction start of the next music composition is controlled so as to start the beat of the next music composition (refer to FIG. 5A) in time to match the beat timing of the previous music composition as described later (refer to the step S12).

A connection pattern shown on a second stage from the top stage of FIG. 5B is referred to as a so-called "cross fade pattern", in which the connection is done as follows. That is, a fade-out is performed on the previous music composition for a predetermined period, and it is ended. Then, a fade-in for the next music composition is started from a timing when the fade-out is started. The fade-in for the next music composition is completed at a timing when the fade-out for the previous music composition is ended. Thus, the reproduction level is kept at a natural level.

A connection pattern shown on a second stage from a bottom stage of FIG. 5B is referred to as a so-called "echo pattern", in which the connection is doe as follows. That is, when the reproduction output of the previous music composition is ended, a portion of a music composition corresponding to a final beat in the previous music composition is repeated in time to match the beat timing of the previous music composition, and the reproduction level is gradually dropped to then carry out the reproduction. Then, the reproduction of the next music composition is started when the reproduction level in the repetition decreases to a zero level. In this echo pattern, the rhythms at the time of the connection can be continuously connected by starting the reproduction of the next music composition so as to coincide with the beat timing of the previous music composition.

Incidentally, if the music compositions are connected through the echo pattern, the previous music composition is ended while the portion of the music composition corresponding to the final beat of the previous music composition is repeatedly reproduced and outputted by the operations of the effect controller 36 and the effect memory 42.

Finally, a connection pattern shown on the bottom stage of FIG. 5B is referred to as a so-called "zip pattern", in which the connection pattern is done as follows. That is, when the reproduction output of the previous music composition is ended, a musical interval or distance of the previous music composition is gradually made down, and the reproduction level of the previous music composition is finally dropped to the zero level. Then, the reproduction of the next music composition is started in time to match the beat timing of the previous music composition from the timing of the zero level. In this zip pattern, when the previous music composition is ended, such a change on the acoustic feeling that a rotation of a so-called analog record is gradually stopped can be obtained.

In addition, in case that the music compositions are connected through the zip pattern, the musical interval or distance (a so-called "key" of a music composition) is gradually made down by the operations of the effect controller 36 and the effect memory 42, and the previous music composition is ended.

In FIG. 4 again, when the connection pattern is selected at the step S13, it is next judged whether or not the selected connection pattern is the cut in pattern (Step S14).

Then, if it is not the cut in pattern (Step S14: NO), the connection to the next music composition is done through another connection pattern (Step S15), and the operational flow proceeds to a step S17.

On the other hand, in the judgment at the step S14, if the selected connection pattern is the cut in pattern (Step S14: YES), the music composition is ended at the final beat timing of the music composition currently being reproduced and outputted. At the same time, the reproduction output of the next music composition is started from the beginning of the beat timing of the next music composition (Step S16). In this case, if the next music composition is recorded on the optical disc DA or DB same as that on which the previous music composition is recorded, the reproduction of the next music composition is started after the BPM value of the next music composition is set so as to coincide with the BPM value of the previous music composition at the timing of the reproduction output.

When the reproduction of the next music composition is started, it is judged whether or not an operation indicative of the end of the auto mix mode shown in FIG. 4 is executed through the operation unit 31 (Step S17). If it is executed (Step S17: YES), the process of controlling the continuous reproduction is ended as it is. On the other hand, if it is not executed and the operation based on the auto mix mode is to be continued (Step S17: NO), the operational flow returns back to the step S3, and the above-mentioned operations are performed on the next music composition whose reproduction is started.

If the preparation for the next music composition is not completed at the step S7 (Step S7: NO), the next music composition is forcedly set (Step S8), and the operational flow proceeds to the step S9.

At this time, as the forcedly setting method at the step S8, for example, when the continuous reproduction is being done by using music compositions within one optical disc DA or DB and also the next music composition is being selected in accordance with a predetermined order, the digital decode signal Sda corresponding to the head portion of the next music composition based on the record order within the optical disc DA or DB is accumulated in the cue memory 40, and it remains on standby.

When the continuous reproduction is being done by alternately using two optical discs DA and DB and also the next music composition is being selected in accordance with the predetermined order or one of the optical discs DA and DB is being exchanged, the digital decode signal Sda corresponding to the head portion of the next music composition based on the record order within the optical disc DA or DB that is currently placed on any of the players 2 or 3 is accumulated in the cue memory 40, and it remains on standby.

Moreover, when the continuous reproduction is being done by using two optical discs DA and DB in a predetermined order (which is a random order and is not the record order) and also the next music composition is not set, the operational flow returns back to the first music composition in the predetermined order. Then, the digital decode signal Sda corresponding to the head portion of the first music composition is accumulated in the cue memory 40, and it remains on standby.

As described above, according to the continuous reproduction controlling process of the embodiment, since the time period required for one beat of the next music composition is controlled to be coincident with that of the previous music composition, and the next music composition is reproduced under such a condition (refer to the steps S11 and S16), it is possible to continuously reproduce the music compositions automatically while the rhythms of the respective music compositions are consistent by means of a relatively simple operation.

Therefore, even in a case that there is no disc jockey who is well trained and experienced for the continuous reproduction of the music compositions especially in a simple club, it is still possible to continuously reproduce the respective music compositions with a good rhythm sense by a relatively simple operation of an ordinary operator, who is not well trained or experienced for the continuous reproduction, so that the dancers are allowed to continue dancing.

Since the next music composition is continuously reproduced while the beat timing of the next music composition is controlled to be coincident with that of the previous music composition (refer to FIG. 5A), it is possible to continuously reproduce the respective music compositions while making the rhythms of the respective music compositions consistent by a relatively simple operation.

Since the next music composition is reproduced while making its strong beat coincident with that of the previous music composition, it is possible to continuously reproduce them while even less interrupting the rhythm sense.

Further, since, if the time period required for one beat (i.e., the BPM value) of the previous music composition cannot be detected (refer to the step S9), the next music composition is continuously reproduced as it is, it is possible to prevent the continuous reproduction of the respective music compositions from being interrupted as the time period required for one beat of the next music composition cannot be detected.

Furthermore, since, if the beat timing of the previous music composition cannot be detected (refer t the step S4), the next music composition is reproduced continuously to the previous music composition as it is from the timing set in advance, it is possible to prevent the continuous reproduction of the respective music compositions from being interrupted as the beat timing of the previous music composition cannot be detected.

Incidentally, the case in which both of the strong beat and the weak beat in each music composition are detected is described in the process of detecting the BPM value in the embodiment. Otherwise, it may be configured so as to recognize each beat timing by detecting only the strong beat.

Also, in the embodiment, the case is described in which the strong beat of the next music composition follows the weak beat of the previous music composition when the connection is done in the continuous reproduction (refer to FIG. 5A (in the case of the quadruple beat)). Otherwise, the connection of a weak beat or a middle strong beat of the next music composition to a weak beat of the previous music composition also enables the connection between the music compositions.

Moreover, in the embodiment, the case is described in which the present invention is applied to the audio information outputting apparatus S including the two players 2 and 3. Otherwise, the present invention can be applied to the case in which an audio information outputting apparatus including three or more players reproduces and outputs a music composition, after a music composition that is reproduced and outputted from one player, in parallel from the other two or more players.

Furthermore, it may be configured such that a program corresponding to the flow chart shown in FIG. 4 is stored in a flexible disc serving as one example of an information record medium etc., and then it is read out and executed by the CPU 30 or the sub CPU 15 and 25. Alternatively, such a computer program may be downloaded to the audio information outputting apparatus S through a network such as an internet.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No.11-220214 filed on Aug. 3, 1999 including the specification, claims, drawings and summary is incorporated herein by reference in its entirety.

What is claimed is:

1. An apparatus for reproducing audio information, comprising:
　a reproducing device which reproduces a first musical composition and reproduces a second musical composition after said first musical composition, wherein said first musical composition is different than said second musical composition;
　a detecting device that detects a first time period of at least one beat of said first musical composition and that detects a second time period of at least one beat of said second musical composition; and
　a controlling device that adjusts the second time period for said one beat of said second musical composition so that said second time period corresponds to said first time period,
　wherein the second musical composition immediately follows the first musical composition.

2. An apparatus according to claim 1, wherein said controlling device does not adjust the second time period for said one beat of said second musical composition when said detecting device cannot detect said second time period.

3. An apparatus for reproducing audio information, comprising:
　a reproducing device which reproduces a first musical composition and reproduces a second musical composition after said first musical composition, wherein said first musical composition is different than said second musical composition;
　a detecting device that detects a first beat timing and a second beat timing, wherein said first beat timing is a time at which a first beat of said first musical composition occurs and wherein said second beat timing is a time at which a second beat of said second musical composition occurs; and
　a controlling device that adjusts the second beat timing so that said time at which said second beat of said second musical composition occurs corresponds to said time at which said first beat of said first musical composition occurs.

4. An apparatus according to claim 3, wherein said first beat and said second beat are strong beats.

5. An apparatus according to claim 3, wherein said controlling device does not adjust the second beat timing of said second musical composition when said detecting device cannot detect said second beat timing, and
　wherein said reproducing device reproduces said second musical composition at a predetermined timing set in advance when said detecting device cannot detect said second beat liming.

6. An apparatus according to claim 3, wherein the detecting device detects a first time period of said first beat and detects a second time period of said second beat, and
　wherein said controlling device adjusts the second time period for said second beat so that said second time period corresponds to said first time period.

7. An apparatus for reproducing audio information, comprising:

a reproducing device which reproduces a first musical composition and reproduces a second musical composition after said first musical composition, wherein said second musical composition is different than said first musical composition;

a first detecting device that detects a first time period of at least one beat of said first musical composition and that detects a second time period of at least one beat of said second musical composition;

a second detecting device that detects a first beat timing and a second beat timing, wherein said first beat timing is a time at which a first beat of said first musical composition occurs and wherein said second beat timing is a time at which a second beat of said second musical composition occurs; and a controlling device that adjusts the second time period for said one beat of said second musical composition so that said second time period corresponds to said first time period, wherein said controlling device adjusts said second beat timing so that said time at which said first beat of said first musical composition occurs corresponds to said time at which said second beat of said second musical composition occurs.

8. An apparatus according to claim 7, wherein said controlling device does not adjust the second time period for said one beat of said second musical composition when said first detecting device cannot detect said second time period.

9. An apparatus according to claim 7, wherein said controlling device does not adjust the second beat timing of said second musical composition when said second detecting device cannot detect said second beat timing, wherein said reproducing device reproduces said second musical composition at a predetermined timing set in advance when said second detecting device cannot detect said second beat timing.

10. A method of reproducing audio information, comprising:

reproducing a first musical composition and reproducing a second musical composition after said first musical composition, wherein said first musical composition is different than said second musical composition;

detecting a first time period of at least one beat of said first musical composition and detecting a second time period of at least one beat of said second musical composition; and adjusting the second time period for said one beat of said second musical composition so that said second time period corresponds to said first time period, wherein the second musical composition immediately follows the first musical composition.

11. A method of reproducing audio information, comprising:

reproducing a first musical composition and a second musical composition after said first musical composition, wherein said first musical composition is different than said second musical composition;

detecting a first beat timing and a second beat timing, wherein said first beat timing is a time at which a first beat of said first musical composition occurs and wherein said second beat timing is a time at which a second beat of said second musical composition occurs; and adjusting the second beat timing so that said time at which said second beat of said second musical composition occurs corresponds to said time at which said first beat of said first musical composition occurs.

12. A method according to claim 11, wherein said first beat and said second beat are strong beats.

13. A method according to claim 11, further comprising:

detecting a first time period of said first beat and detecting a second time period of said second beat; and adjusting the second time period for said second beat so that said second time period corresponds to said first time period.

14. A computer-readalble medium containing a program of instructions executable by a computer to perform a routine, comprising:

reproducing a first musical composition and a second musical composition after said first musical composition, wherein said first musical composition is different than said second musical composition;

detecting a first time period of one beat of said first musical composition and detecting a second time period of one beat of said second musical composition; and adjusting the second time period for one beat of said second musical composition so that said second time period corresponds to said first time period, wherein the second musical composition immediately follows the first musical composition.

15. A computer-readable medium containing a program of instructions executable by a computer to perform a routine, comprising:

reproducing a first musical composition and a second musical composition after said first musical composition, wherein said first musical composition is different than said second musical composition;

detecting a first beat timing and a second beat timing, wherein said first beat timing is a time at which a first beat of said first musical composition occurs and wherein said second beat timing is a time at which a second beat of said second musical composition occurs; and adjusting the second beat timing so that said time at which said second beat of said second musical composition occurs corresponds to said time at which said first beat of said first musical composition occurs.

16. A computer-readable medium according to claim 15, wherein said first beat and said second beat are strong beats.

17. A computer-readable medium according to claim 15, wherein said routine further comprises:

detecting a first time period of said first beat and detecting a second time period of said second beat; and adjusting the second time period for said second beat so that said second time period corresponds to said first time period.

18. A computer data signal embodied in a carrier wave and representing a series of instructions which cause a computer to perform a routine, comprising:

reproducing a first musical composition and a second musical composition after said first musical composition, wherein said first musical composition is different than said second musical composition;

detecting a first time period of at least one beat of said first musical composition and detecting a second time period of at least one beat of said second musical composition; and adjusting the second time period for said one beat of said second musical composition so that said second time period corresponds to said first time period, wherein the second musical composition immediately follows the first musical composition.

19. A computer data signal embodied in a carrier wave and representing a series of instructions which cause a computer to perform a routine, comprising:

reproducing a first musical composition and a second musical composition after said first musical composition, wherein said first musical composition is different than said second musical composition;

detecting a first beat timing and a second beat timing, wherein said first beat timing is a time at which a first beat of said first musical composition occurs and wherein said second beat timing is a time at which a second beat of said second musical composition occurs; and adjusting the second beat timing so that said time at which said second beat of said second musical composition occurs corresponds to said time at which said first beat of said first musical composition occurs.

20. A computer data signal according to claim 19, wherein said first beat and said second beat are strong beats.

21. A computer data signal according to claim 19, wherein said routine further comprises:

detecting a first time period of said first beat and detecting a second time period of said second beat; and adjusting the second time period for said second beat so that said second time period corresponds to said first time period.

* * * * *